United States Patent [19]
Schneider

[11] 3,899,149
[45] Aug. 12, 1975

[54] BED DRAINAGE TUBE HOLDER

[76] Inventor: William H. Schneider, 3217 Mt. Troy Rd., Pittsburgh, Pa. 15212

[22] Filed: July 12, 1974

[21] Appl. No.: 487,858

[52] U.S. Cl. .................. 248/75; 5/317 R; 248/74 R; 248/229
[51] Int. Cl.² ......................................... A61G 7/06
[58] Field of Search...... 248/75, 226 B, 226 A, 229, 248/51, 228, 72, 74 A, 49; 5/92, 317 R; 128/2 F, 2 M, 350 V, 214 R; 4/110; 24/243 H

[56] References Cited
UNITED STATES PATENTS

| | | | |
|---|---|---|---|
| 372,288 | 11/1887 | Bailey | 5/317 R |
| 1,806,773 | 5/1931 | Waters | 248/229 X |
| 1,943,136 | 1/1934 | Moser | 248/51 |
| 2,144,272 | 1/1939 | Ray | 248/51 |
| 2,248,170 | 7/1941 | Hansen | 248/226 A |
| 2,707,953 | 5/1955 | Ryan | 128/214 R |
| 2,935,118 | 5/1960 | Meilleur | 248/226 A X |
| 3,251,069 | 5/1966 | Clark | 248/75 X |
| 3,324,853 | 6/1967 | Czor nny et al. | 248/74 A |
| 3,345,023 | 10/1967 | Scott et al | 5/92 X |
| 3,601,295 | 8/1971 | Lowe | 248/229 X |

Primary Examiner—Roy D. Frazier
Assistant Examiner—Rodney H. Bonck
Attorney, Agent, or Firm—Parmelee, Miller, Welsh & Kratz

[57] ABSTRACT

A bedside holder has a longitudinally extending, relatively rigid arm member provided with an open side or channel portion therealong to receive a flexible drainage or irrigation tubing therein for mounting it on the side rail of a bed to take the place of a conventional cloth strip and safety pin type of mounting. The arm member carries an adjustable clamping means at its lower end portion to secure it on the side rail of a bed frame; a split ring is rotatably carried by the holder to close-off an upper portion of its open side and provide a loose extended-through retention of the tubing within its channel portion. A clamping swing finger is carried by a lower end portion of the arm member, to not only close-off the open side of the channel portion, but to positively engage the tubing and retain it in position against vertical movement. The swing finger has quick latching means and is carried adjacent the rail clamping means.

19 Claims, 8 Drawing Figures

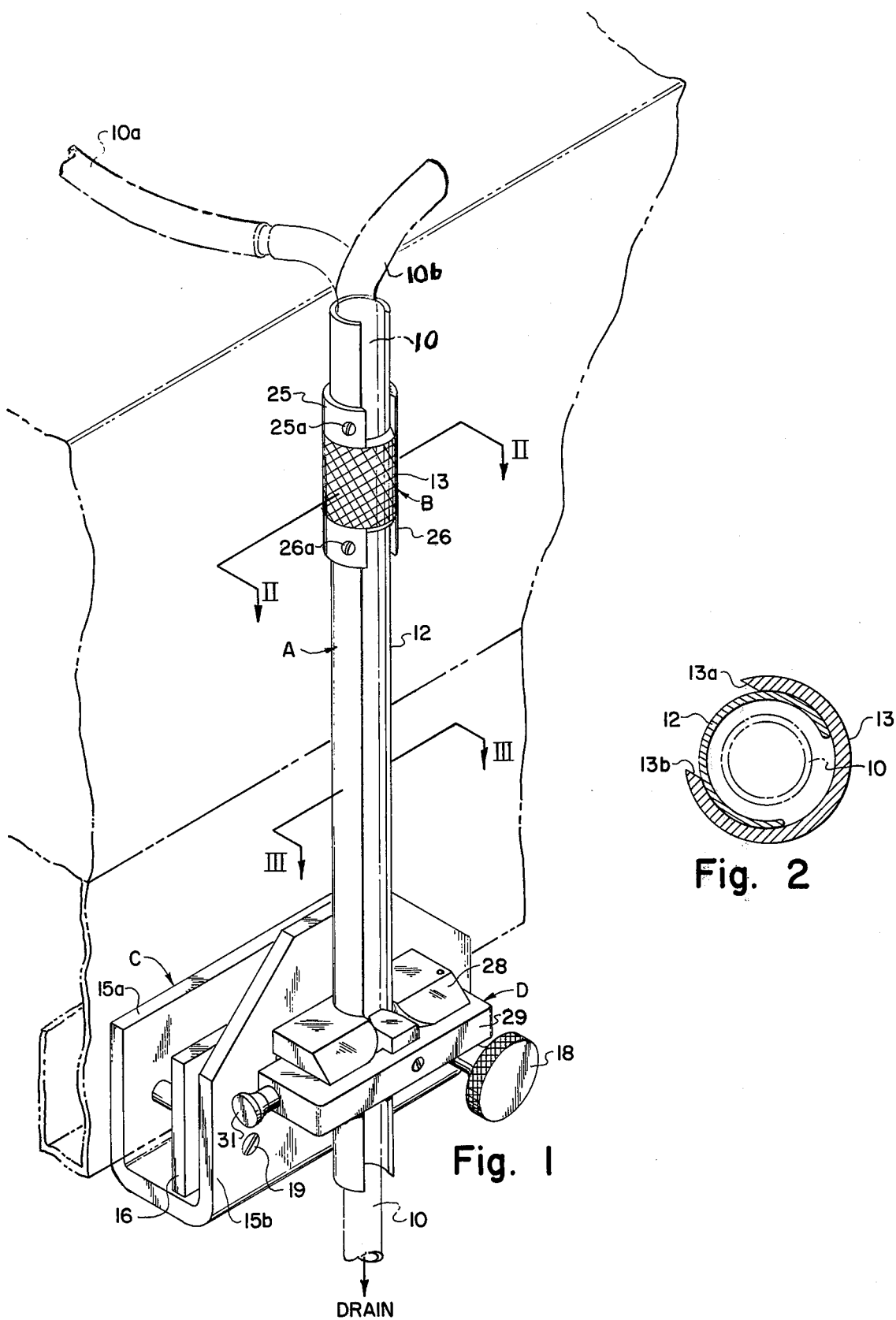

3,899,149

BED DRAINAGE TUBE HOLDER

BACKGROUND OF THE INVENTION

1. Field of the Invention

This invention pertains to aa bedside tube holding device or unit for use with a hospital bed and the like to facilitate retention and utilization of flexible drainage or irrigation tubing and particularly, to a construction that will meet hospital requirements.

2. Description of the Prior Art

For many years it has been customary in utilizing flexible drainage or irrigating tubing and the like for the nurse to use safety pins and/or cloth strips therewith to mount the tubing on the upper side of the bed mattress. Oftentimes the tubing is at least partially pinched to a flow restricting position and is not retained in its desired positioning during bed movement of the patient. In general, this method presents a nurse with the problem of avoiding injury to her fingers and the flexible tubing, of avoiding the possibility of the lower end of the tubing being pulled out of an under or floor-positioned receptacle, and of fixing an air vent in such a manner as to avoid fluid leakage therefrom.

There has been an attempt to provide a clamp-on type of holder in which the tubing is somewhat loosely anchored to extend through a hole in a plate member or an extension thereof, and which has a spring clip mounting on the rail of the side frame of a bed. However, this construction has not been successful, particularly because of its somewhat superficial type of mounting of the tubing and its lack of recognition of factors which should be met in providing a successful substitute for the conventional cloth tie and safety pin type of mounting.

SUMMARY OF THE INVENTION

It has thus been an object of the present invention to provide a drainage and irrigation tube holder for bedside mounting that will fully meet the factors involved and provide a practical substitute for the conventional pin and cloth tie.

Another object of the invention has been to develop a bedside holder device for flexible drainage or irrigation tubing that is of a construction that will facilitate sterilization after each patient usage, and that will provide a desirable, accurate and positive type of positioning and retention of the tubing.

A further object of the invention has been to provide a bedside holder device that will, at its upper end, provide a loose extended-through type of positioning for the flexible tubing, and that will at its lower end provide a positive, position-retaining gripping action on the tubing, and that will also assure an adjustable and secure mounting of the device with respect to the side frame or rail of a patient's bed.

These and other objects of the invention will appear to those skilled in the art from the illustrated embodiment and the claims.

BRIEF DESCRIPTION OF THE DRAWINGS

In the drawings,

FIG. 1 is a side perspective view in elevation showing a device of the invention in a vertical position that corresponds to its mounted vertical positioning with respect to the mattress of a bed and the side rail of a bed frame;

FIG. 2 is an enlarged sectional view taken along line II—II of FIG. 1;

Figure 5:
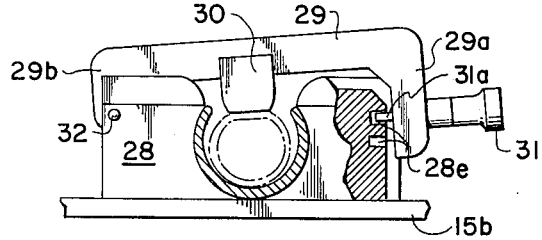
FIG. 5 is a horizontal view, partially in section, showing how the knuckle part may be latched in a clamping position.
Figure 8:
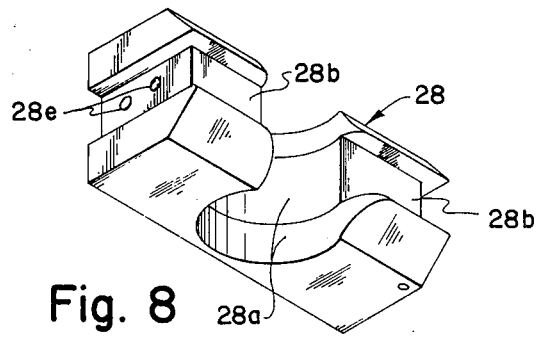

And, FIG. 8 is a top to side perspective view on the scale of and showing details of the construction of a bottom block part of the latching means of FIG. 5.

DESCRIPTION OF THE PREFERRED EMBODIMENT

In carrying out the invention, a tube holder device or unit for bedside mounting is illustrated which employs a longitudinally extending slit or open-sided tubular arm or vertical support member part A of open-end and hollow construction along its length for supporting an intermediate length portion of flexible drainage tubing 10 that is to be used for a hospital or other patient. The tubing may be of a suitable resin material such as nylon. The holder A also has an upper retention collar or ring member B of split ring or sleeve-like construction which is adapted to close-off the upper end portion of the arm A from the standpoint of its open side and somewhat slidably retain the tubing 10 in position within its longitudinal slot, channel or groove portion.

An adjustable bed frame clamping part C of channel shape is secured to extend transversely and horizontally from the arm part A and is adjustable for demountably clamping it in position upwardly on the rail of a bed frame. As will be apparent from FIGS. 1 and 7, the rail may be clamped between a front wall plate portion 15b and a screw-mounted, adjustable clamping plate 16 or between the latter and back wall plate portion 15a. This provides adaptability for different types of beds. A knuckle-like, clamping, swing finger, positive position-retaining unit or part D for the tubing 10 is shown mounted on the lower end portion of the holder A in an opposite transverse position with respect to the rail clamping part C for swiveling or swinging movement into and out of a positive compression or pinching grip of the tubing 10, with an attendant closing-off of the side opening or channel portion of the arm member A.

The arm member A may be of a length such that its upper end will lie in line adjacent and below the upper or bed surface of a mattress to extend vertically therealong and along the side rail of a bed frame. The holder device is constructed and may be utilized in such a manner as to retain full flexibility of the tubing 10 along the upper reaches or planar surface of the mattress. The tubing 10 may have a single end portion when used as an irrigation tube and also, as shown, may have two branches 10a and 10b when used as a drainage tube, with one branch 10a being connected to the incision or opening in the body of the patient, and with the other branch 10b providing a pressure equalizing vent to the atmosphere. The lower end of the tubing 10 may be fastened to a water-tight plastic bag or extend into a floor positioned receptacle (not shown).

It was determined in evaluating the requirements of a device for the above stated purpose that it should avoid positively clamping the flexible tubing and should only provide a relatively loose, collar-like retention thereof adjacent the upper area of the bed (see the collar B). It should positively grip or clamp the tubing 10 at a lower, downwardly spaced position along the arm A to not only provide a through-extending holding action within the length of the channel portion or gripping action such that the tube 10 will be unable to creep or move vertically with respect thereto. The tubing 10 should be given a dual supported mounting in a relatively rigid arm member A, but the arm member should enable the tubing 10 to be inserted and removed therefrom by a side, as distinguished from a purely endwise movement. It is important to provide bed mounting means that will be adaptable to side rail positioning and, at the same time, that will provide a quick positive type of gripping, mounting action with respect thereto as controlled by the loosening and tightening down of a screw-operated intermediate clamping piece.

As shown particularly in FIGS. 1 and 2, the split ring retention member B has an outer wall surface 13 of knurled construction to facilitate finger gripping it for effecting turning movement thereof. Its open portion is defined by lip edges 13a and 13b which represent the thickness of its wall section and which, as shown in FIG. 2, are sloped or beveled inwardly. This inward sloping or beveling has been found to be important in avoiding any tendency of such edges to move or push the tubing 10 out of position within the channel of the arm member A. The width of the open, side portion of the ring B, as well as the width of a tubular shaped wall 12 of the arm member A is sufficient to permit the tubing member 10 (usually three-eighth of an inch for a drainage tube and one-half of an inch for a vertical tube) to be freely introduced and removed sidewise therethrough. This facilitates mounting and removing the tubing 10 with respect to the supporting arm member A without necessity of threading it through upper and lower ends of the arm member. Upper and lower split collars 25 and 26 retain the split ring B in a rotatable position adjacent a top end portion of the arm member A and are removably secured in position thereon by metal screws 25a and 26a.

Figure 3:
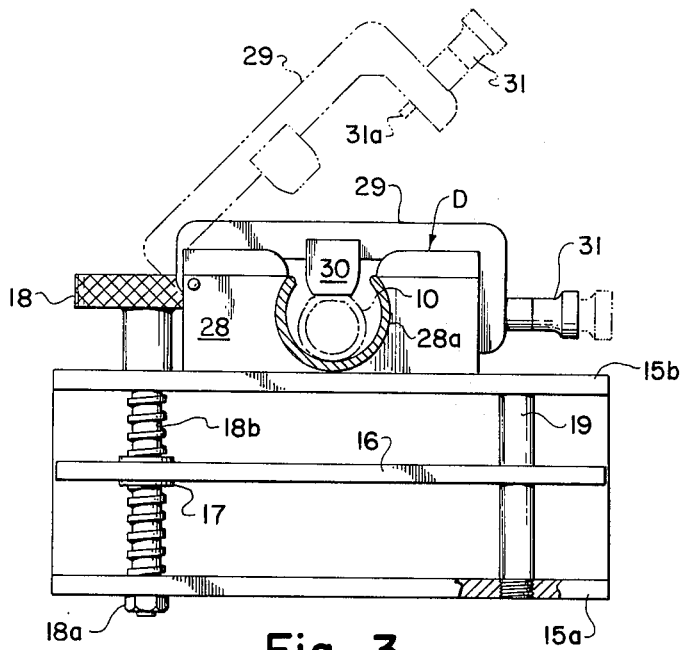
FIG. 3 is a horizontal section on the scale of and taken along the line III—III of FIG. 1.
Figure 4:
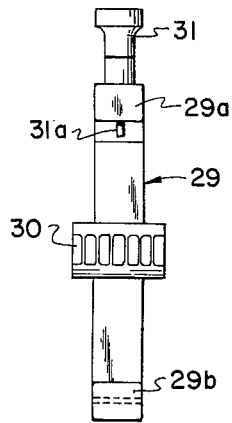
FIG. 4 is a fragment on the same scale as FIG. 3 and showing a clamping knuckle or finger part of the construction of FIG. 3 from its under side.
Figure 6:
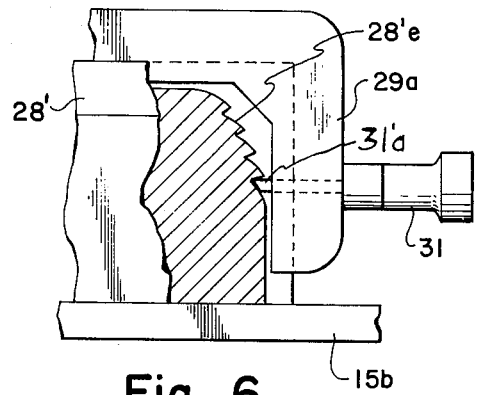
FIG. 6 is an enlarged horizontal side fragment, partially in section, showing a modified form of latching means for the knuckle part.

The swing finger unit D, as shown particularly in FIGS. 1, 3, 4, 5 and 8, has a recessed block-like base or mounting part 28 that is provided with a central, open hole portion 28a to fit on and about the arm member A. The base part 28 may be secured in any suitable manner to the arm member A to form unitary construction therewith and extend substantially horizontally from opposite sides thereof. A latching finger part 29 of somewhat yoke-like or inverted U-shaped shape is pivoted at one end by pin 32 for swinging movement with respect to the base part 28, from an outer unlatching position (as illustrated by the dot and dash lines of FIG. 3) to an inner latched position (such as illustrated in FIGS. 3 and 6), in which it lies within centrally disposed recess portions 28b of the base part 28. The finger 29 has a cross-extending clamping foot 30 which is secured in a suitable manner to centrally project transversely thereof in a downward direction therefrom. As shown in FIG. 4, the foot 30 may have a corrugated surface to facilitate gripping and position retaining engagement with an adjacent portion of the tubing 10 when, as shown at the full lines of FIGS. 3 and 5, the finger 29 is in its "down" or latched position.

The front end of the swing finger 29 carries a latching or locking pin 31 that is provided with a latching end portion 31a. The end portion 31a is resiliently urged to an outer latching position within latching recess means, such as 28e of FIG. 5 or 28'e of FIG. 6, through the agency of a tension spring mounted internally of the pin 31. In the embodiment of FIG. 5, the latching recess means is provided by a pair of vertically spaced hole portions 28e in one end of the base or block part 28, while in the embodiment of FIG. 6, it is provided by ratchet-like latching teeth 28'e along the end portion. In the latter embodiment, the latching end portion 31'a is of wedge or pointed shape to provide a complementary fit within one of the recesses provided by the tooth area 28'e, and to permit the end portion 31'a to ride down over upper teeth for latching engagement within a suitable tooth of the group 28'e.

Figure 7:
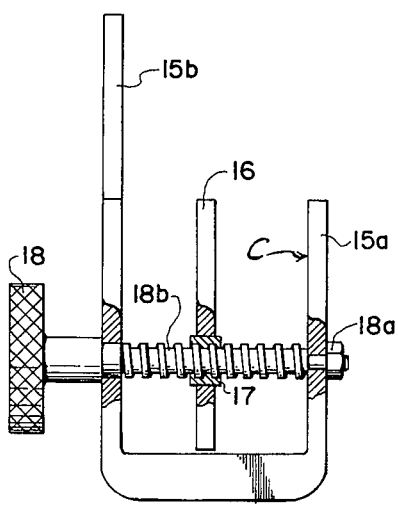
FIG. 7 is a side view in partial section showing details of the construction of bed rail or frame clamping means of the construction illustrated in FIG. 1.

The rail clamping part C, as shown particularly in FIGS. 1, 3 and 7, has a channel or U-shaped body made up of a back wall portion 15a that is connected by a bridging bottom wall portion to a front wall portion 15b of greater vertical heighth or extent. A knurled adjusting screw element 18 is shown mounted to extend across between the wall portions 15a and 15b for rotative movement with respect thereto by means of enlarged and reduced diameter stem portions and a nut 18a threadably secured on its back end. An intermediately positioned adjustable clamping plate member 16 is provided with a threaded bushing 17 for cooperating adjustable operation on a central threaded stem portion 18b of the screw element. It will thus be apparent that the member 16 may be secured into close adjacency with either the back wall portion 15a or front wall portion 15b, depending upon the direction of rotation of the thumbscrew 18. Thus, the rail of a bed frame may be carried within either the area defined by the member 16 with respect to the wall 15a or the area defined by the member 16 with respect to the wall 15b. This facilitates mounting the holder on beds having rails of different inward spacing from the side of the bed and gives a nurse better control over the position of the holder with respect to the side of the mattress. It has been found to be preferable to maintain the tubular wall 12 in close abutment or adjacency with the side edge of the mattress.

In employing the holder, it may be first clamped in position on a bed rail by the means C and then its finger 29 swung to an open position and its ring B turned to an open position. This permits a length of tubing 10 to be inserted sidewise within the channel defined by the wall 12 of the longitudinal arm member A. After such an insertion, the ring B may then be rotated to a closed position (such as shown in FIG. 1) to loosely retain the tubing 10 within the member A. After connections have been made with the patient and with a floor positioned receptacle, which may necessitate some vertical adjustment of the tubing 10 within the arm member A, then the finger 29 is swung to its closed position of FIG. 1 to securely retain the tubing 10 in the selected operating position.

The bedside holder device may be constructed of a suitable metal such as aluminum or stainless steel or of a resin material, such as a thermoplastic polymethyl methacrylate type polymer. It will preferably be made with its lower collar 26 and its part D molded, bonded or secured integrally with respect to the arm member A. Although as shown in FIG. 1, the tubing 10 may be provided with upper branches, such as 10a and 10b, it may also consist of a single length where, for example, it is to be used as a catheter. Where the tubing 10 is to be provided with an air branch line 10b, the holder device of the invention enables the connecting branch or Y portion, as shown in FIG. 1, to be mounted in such a manner that the downstream end portion of the air branch 10b has a suitable below-bed-level vertical position to thus prevent any bed leakage of the fluid being carried off by the patient's branch line 10a. Another important feature of the device involves the use of an arm member A that permits the mounting of the tubing 10 therein without the necessity of removing any connected branch lines or connected collecting bag before its insertion. That is, no threading-through is required.

I claim:

1. In a bedside holder for a length of flexible tubing that is to be positioned to extend from an upper side of a mattress downwardly therefrom past a side rail of a bed frame to empty into an under-positioned receptacle, a longitudinally extending support arm having a channel portion therealong that is open along one side and at opposite end portions thereof to removably sidewise-receive an upper portion of a length of flexible tubing therein, ring-like retention means rotatably carried on said arm for alternately exposing and closing-off at least a portion of the open side of said channel portion to enable a sidewise insertion of the tubing therewithin and a subsequent retention of it in a through-extending relation therealong, and rail clamping means carried by said arm for removably securing it to the side rail of the bed frame.

2. In a holder as defined in claim 1, means cooperating with said arm to position-retain the tubing in a nonslidable relation within said channel portion.

3. In a holder as defined in claim 2, said ring-like retention means loosely retaining the tubing within said channel portion for adjustable movement therealong, and said cooperating means being carried by said arm for movement into and out clamping engagement with the tubing.

4. In a holder as defined in claim 2, said retention means being of split ring construction, and means carried by said arm for mounting said retention means in a rotative position thereon.

5. In a holder as defined in claim 1, means rotatably positioning said ring-like retention means on said arm, and said retention means having an open side therealong whose edges are constructed to facilitate retention of the tubing within said channel portion after its insertion therein and during rotative movement of said retention means.

6. In a holder as defined in claim 2 wherein said support arm is positioned to extend substantially vertically downwardly along the bed frame, said retention means being positioned adjacent an upper end portion of said arm, and said rail clamping means and said cooperating means being carried by said arm adjacent a lower end portion thereof.

7. In a holder as defined in claim 2, said retention means being positioned adjacent one end portion of said arm, and said cooperating means being carried by an opposite end portion thereof.

8. In a holder as defined in claim 7, said retention means being a split ring adapted to be turned on said arm into and out of an encircling position about the open side of said channel portion.

9. In a holder as defined in claim 7, said cooperating means having a clamping finger swingably mounted with respect to said arm and adapted to be swung into and out of clamping engagement with tubing positioned in said channel portion.

10. In a bedside holder as defined in claim 9, said retention means being a split ring rotatably positioned on said arm for turning into and out of an enclosing position about the open side of said channel portion to retain the tubing therein.

11. In a bedside holder as defined in claim 1, said retention means being a split ring rotably mounted on said arm for turning movement into and out of an enclosing position about the open side of said channel portion; and the edges of said ring along the split therein being inwardly beveled therealong for turning movement without dislodging the tubing from said channel portion.

12. In a bedside holder as defined in claim 1, said rail clamping means having an upwardly open channel-shaped body to fit over the side rail, having a clamping piece positioned within said channel-shaped portion, and having an adjustment screw for in cooperation with opposite sides of said body moving said clamping piece into and out of a tight clamping position with the side rail.

13. In a bedside holder for a length of flexible tubing that is to be positioned to extend vertically from the upper side of a mattress downwardly along a side of the mattress and a side rail of a bed frame to empty into a receptacle, a tube-like longitudinally vertically extending arm having opposite open end portions and an open side portion defining a channel portion therealong for receiving an intermediate portion of the length of the tubing therein to extend from opposite ends thereof, a rotatable ring-like means having an open side portion and carried by said arm for closing-off turning movement thereon with respect to the open side portion; a transversely extending adjustable rail clamp secured to a lower portion of said arm, having a U-shaped clamping body to fit over the side rail, and having an adjustable screw-operated clamping piece within said clamping body to cooperate therewith for mounting said arm in a secure relation on the side rail; and finger means operatively secured on the lower end portion of said arm for movement across the open side of said channel portion into and out of a clamping position-retaining relation with the tubing at the lower end portion of said arm.

14. In a bedside holder as defined in claim 13, said ring-like means having inwardly beveled edges along its open side portion for retaining the tubing within the channel portion of said arm during its turning movement into and out of a closing-off relation with respect to the open side portion of said arm.

15. In a bedside holder as defined in claim 13, said finger means comprising, a base part secured to extend transversely from opposite sides of said arm and above the open side portion thereof, a swing finger part hinged to one end portion of said base part and having a centrally disposed wedge-like portion adapted to move through the open side portion of said arm into engagement with tubing in said channel portion when said finger part is swung into a closed position with respect to said base part, a latch pin carried by said finger part, and latching recess means in said base part for engagement by said latch pin to retain said finger part in its closed position.

16. In a bedside holder as defined in claim 15, said clamping piece being centrally positioned between opposite walls of said U-shaped clamping body, a guide element extending across between the opposite walls for guiding movement of said piece therebetween, and a threaded screw extending across between the opposite walls and adjustably carrying said clamping piece for thereon moving said piece between the opposite walls into and out of clamping engagement with the side rail of a bed.

17. In a bedside holder as defined in claim 15, said latching recess means comprising latching teeth in an end portion of said base part.

18. In a bedside holder as defined in claim 17, said latching recess means comprising vertically spaced-apart latching hole portions in an end portion of said base part.

19. In a bedside holder for a length of flexible tubing that is to be positioned to extend from an upper side of a mattress downwardly along a side thereof past a side rail of a bed frame to empty into an under-positioned receptacle, a vertically extending longitudinal guide-support arm having a channel portion that is open along one side and at opposite end portions thereof to removably sidewise-receive a downwardly extending portion of a length of flexible tubing therein, retention means operatively carried on the arm for closing-off at least a portion of the open side of said channel portion to retain the tubing in a vertically adjustable through-extending relation therealong, adjustable rail clamping means carried by said arm for removably securing said arm on the side rail of the bed frame; said rail clamping means having a U-shaped body to fit over the side rail, having an adjustment screw rotatably journaled within opposite sides of said U-shaped body and provided with a centrally disposed threaded portion, and having a clamping piece adjustably mounted on said threaded portion between the opposite sides of said U-shaped body for movement into and out of a rail clamping relation with either side of said U-shaped body to secure said clamping means on the side rail; finger means operatively carried by said clamping means for movement across the open side of said channel portion into and out of a position-retaining clamping position with the tubing therein, and adjustable position means for retaining said finger means in one of a group of clamping positions with respect to the tubing.

* * * * *